Sept. 9, 1941.   R. TAMPIER   2,255,195
BALL JOINT
Filed May 31, 1940
Fig. 1.
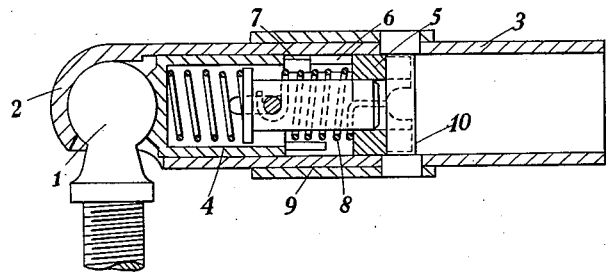
Fig. 2.
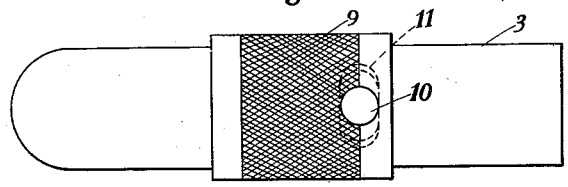
Fig. 3.
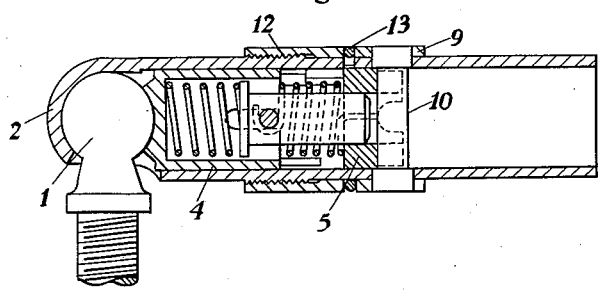
Fig. 4.   Fig. 5.
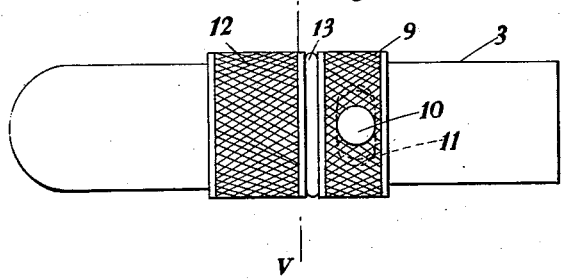 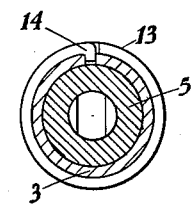
INVENTOR
René Tampier
BY
ATTORNEY Patented Sept. 9, 1941

2,255,195

UNITED STATES PATENT OFFICE 2,255,195

BALL JOINT

René Tampier, Cricklewood, London, England

Application May 31, 1940, Serial No. 338,216
In Great Britain April 16, 1940

4 Claims. (Cl. 287—90)

This invention relates to ball joints of the kind comprising a ball located in a casing, a member actuated by a torsion spring for exerting pressure on the ball to retain it in the casing, and a ring on the casing operatively associated with the said member and adapted to be rotated against the action of the torsion spring to release the retaining pressure exerted by the said member on the ball, to permit it to be removed from the casing. This kind of ball joint is hereafter referred to as "of the kind described."

In ball joints of the kind described, it is possible for the ball, by reason of continuous rubbing contact, to wear unevenly, some diameters of the ball becoming smaller. In certain positions of the ball, therefore, the member exerting the retaining pressure on the ball can move to an extent depending on the wear of the ball. If now the control imparts to the ball a movement of greater amplitude than usual, it is possible, by reason of the pressure exerted by the retaining member, for the ball to jam in its socket with the result that the desired control cannot be carried out.

The object of the present invention is to overcome this disadvantage.

The invention is illustrated by way of example in the accompanying drawing, wherein Figure 1 is a longitudinal section of one form of ball joint, forming the subject of my co-pending U. S. A. patent application, Serial No. 338,-214, filed May 31, 1940, to which the present invention may be applied;

Figure 2 is a plan view of Figure 1;

Figures 3 and 4 are, respectively, views similar to Figures 1 and 2, but embodying the present invention, and Figure 5 is a section on line V—V, Figure 4.

Figures 1 and 2 are included to facilitate understanding of the present invention. The arrangement is described in detail in my above mentioned co-pending specification and need only be briefly described herein. I is a ball held in the socket end 2 of a casing 3 by a spring pressed socket member 4 on which an axial thrust is imparted by a member 5, the adjacent edges of the members 4 and 5 being formed in the manner of a dog clutch, the teeth having inclined edges. The inclined edges of the teeth 6 on the member 5 are pressed against the inclined edges of the teeth 7 on the member 4 by a torsion spring 8, suitably arranged to exert a torsion on the member 5. In this way an axial pressure is exerted on the ball 2 through members 5 and 6, this pressure being sufficient to retain the ball in the casing. In order to extract the ball from the casing, means are provided for rotating the member 5 against the action of the torsion spring 8 to enable the teeth 7 to engage in the gaps between the teeth 6 whereupon the member 4 can be slid inwardly to permit the ball to be removed from the casing. These means comprise a sleeve 9 connected to the member 5 by a pin 10 which can move in a slot 11 in the casing 3. The sleeve 9 can thus be manually rotated against the action of the spring 8 through an angle determined by the length of the slot 11.

In the arrangement above described it is possible when the ball joint has been in use for some time, for the ball to become unevenly worn with the result that the pressure exerted by the members 4 and 5 may in certain circumstances cause the ball to jam. According to the present invention, and as illustrated in Figures 3–5, means are provided for limiting the pressure which can be exerted by the members 4 and 5 on the ball, these means permitting of adjustment from time to time, according to the wear on the ball.

In Figures 3–5 a nut 12 is screwed on to a threaded part of the casing and is separated from the sleeve 9 by a steel wire ring 13, one end 14 of which is anchored to the casing 3. Thus, whilst the ring, by reason of being anchored, is not free to rotate, it is capable of some slight axial movement and serves to transmit a locking pressure from the nut 12 to the sleeve 9. Instead of being anchored at one end, the ring 13 may have a radial slot in its periphery to engage a pin on the casing, the pin and slot connection being dimensioned so as to permit axial movement of the ring relatively to the casing but preventing rotatable movement.

With the arrangement described the axial position of the nut 12 on the casing 3 can be adjusted as desired to limit the maximum pressure which can be exerted on the ball by the members 4, 5, this maximum pressure being insufficient to produce jamming of the ball 1.

What I claim is:

1. In a ball joint, a casing, a ball located in said casing, a torsion spring, a member actuated by said torsion spring to exert pressure on the ball to retain it in the casing, a ring on the casing directly connected to said member and adapted to rotate said member against the action of the torsion spring to release the retaining pressure exerted by the said member on the ball, to permit it to be removed from the casing, and a locking device mounted on the casing and cooperating with the ring to prevent any follow-up movement, consequential on wear of the ball, of the member exerting pressure on the ball, the said member being locked in a position determined by the locking member.

2. In a ball joint, a casing, a ball located in said casing, a torsion spring, a member actuated by said torsion spring to exert pressure on the ball to retain it in the casing, a ring on the casing operatively associated with the said member and with said torsion spring and adapted to be rotated against the action of the torsion spring to release the retaining pressure exerted by the said member on the ball, to permit it to be removed from the casing, and a locking device comprising a screw thread on said casing and a nut engaging said screw thread and adapted to exert axial pressure on the ring sufficient to prevent rotary movement thereof when the joint is in use, and thus to prevent any follow-up movement, consequential on wear of the ball, of the member exerting pressure on the ball, the said member being locked in a position determined by the locking member.

3. In a ball joint, a casing, a ball located in said casing a torsion spring, a member actuated by said torsion spring to exert pressure on the ball to retain it in the casing, a ring on the casing operatively associated with the said member and with said torsion spring and adapted to be rotated against the action of the torsion spring to release the retaining pressure exerted by the said member on the ball, to permit it to be removed from the casing, a locking device comprising a screw thread on said casing, a nut engaging said screw thread and adapted to exert an axial pressure on the ring sufficient to prevent rotary movement thereof when the joint is in use, and thus to prevent any follow-up movement, consequential on wear of the ball, of the member exerting pressure on the ball, the said member being locked in a position determined by the locking member, and a non-rotatable ring disposed between the nut and the rotatable ring to transmit the locking pressure from the nut to the rotatable ring, thereby preventing frictional contact between the nut and the rotatable ring.

4. In a ball joint, a casing, a ball located in said casing, a torsion spring, a member actuated by said torsion spring to exert pressure on the ball to retain it in the casing, a ring on the casing operatively associated with the said member and with said torsion spring and adapted to be rotated against the action of the torsion spring to release the retaining pressure exerted by the said member on the ball, to permit it to be removed from the casing, a locking device comprising a screw thread on said casing, a nut engaging said screw thread and adapted to exert an axial pressure on the ring sufficient to prevent rotary movement thereof when the joint is in use, and thus to prevent any follow-up movement, consequential on wear of the ball, of the member exerting pressure on the ball, the said member being locked in a position determined by the locking member, and a non-rotatable ring comprising a steel wire, one end of which is fixed to the casing, disposed between the nut and the rotatable ring to transmit the locking pressure from the nut to the rotatable ring, thereby preventing frictional contact between the nut and the rotatable ring.

RENÉ TAMPIER.